United States Patent [19]
Frick

[11] Patent Number: 6,072,560
[45] Date of Patent: Jun. 6, 2000

[54] PHOTOELECTRIC SCANNING DEVICE FOR A TRANSPARENT OBJECT

[75] Inventor: Beat Frick, Buchs, Switzerland

[73] Assignee: Gretag Imaging AG, Regensdorf, Switzerland

[21] Appl. No.: 09/195,667

[22] Filed: Nov. 19, 1998

[30] Foreign Application Priority Data

Nov. 20, 1997 [EP] European Pat. Off. .............. 97120372

[51] Int. Cl.[7] .......................... G03B 27/52; G03B 27/80; G03B 27/72
[52] U.S. Cl. ................................. 355/41; 355/35; 355/38
[58] Field of Search .................................. 355/35, 38, 39, 355/40, 41, 81–84; 358/296, 474, 487, 506

[56] References Cited

FOREIGN PATENT DOCUMENTS

0489719A2 10/1988 European Pat. Off. .
0417042A1 8/1990 European Pat. Off. .

Primary Examiner—Safet Metjahic
Assistant Examiner—Hung Henry Nguyen
Attorney, Agent, or Firm—Burns, Doane, Swecker & Mathis, LLP

[57] ABSTRACT

A device for point-form photoelectric scanning of a transparent object to be measured is disclosed and is provided with a transport arrangement for transporting an object to be measured. An illuminating arrangement exposes the object to measuring light in a line-shaped measuring line extending across the object transverse to the transport direction. A collector arrangement collects measuring light passed through the object in the area of the measuring line. A photoelectric converter arrangement, optically connected with the collector arrangement, converts measuring light passed through the object into corresponding electrical signals. The collector arrangement includes a multiplicity of light conductors, an optical multiplexer with multiple inputs corresponding in number to the multiplicity of the light conductors, and an output. An output end of each of the light conductors is connected with one of the inputs of the optical multiplexer and an input end of each light conductor is positioned along the measuring line to receive passed through measuring light from point form regions of the object to be measured. The optical multiplexer includes a rotatable optical commutator driven by a motor which sequentially and optically connects the inputs of the multiplexer with the output of the multiplexer. The illuminating arrangement includes a light source and a light guide body which has an input surface and an output surface and guides light from the light source to the object to be measured.

11 Claims, 5 Drawing Sheets

… … … … … … … … … … …

PHOTOELECTRIC SCANNING DEVICE FOR A TRANSPARENT OBJECT

This application claims priority under 35 U.S.C. §§119 and/or 365 to 97 120 372.4 filed in Europe on Nov. 20, 1997; the entire content of which is hereby incorporated by reference.

FIELD OF THE INVENTION

The invention relates to a scanning arrangement for the essentially point form photoelectric measurement of a transparent object, especially a picture field of a photographic film and in a photograph copier.

BACKGROUND ART

Scanning devices of this type are generally called scanners and are known in numerous variants and in practical use. Constant technological progress makes it desirable in the field of the photographic copying devices to scan originals not only in the three classical base colours red, blue and green, but to scan them spectrally in order to generate the prerequisites for a refined exposure control. While spectral photometers suitable in this respect are known and available, the realization of a spectrally operating scanning device for photograph copiers is associated with significant practical difficulties because of the associated high cost.

The present invention is now intended to overcome this difficulty and to disclose a scanning arrangement which provides the basis for a spectral point form measurement of a transparent object and at a manufacturing cost acceptable in practice.

SUMMARY OF THE INVENTION

Accordingly, the invention provides a scanning device for the essentially point-form photoelectric scanning of a transparent object, especially picture fields of a photographic film in a photograph copier, with a transport arrangement (T) for the transporting of an object (M) to be scanned in a transport direction (P), an illuminating arrangement (B) for exposure of the object to measuring light in a linear measuring line (Z) extending across the object essentially transverse to the transport direction, a collector arrangement (A) for measuring light having passed the object in the area of the measuring line and a photoelectric converter arrangement (W) optically connected with the collector arrangement for conversion of the measured light which passed through the object (M) into corresponding electrical signals, characterized in that the collector arrangement (A) includes a multiplicity of especially fiber-shaped light conductors and an optical multiplexer with a plurality of inputs corresponding in number to the multiplicity of light conductors and an output, whereby an output end of each light conductor is connected with one of the inputs of the optical multiplexer and an input end of each light conductor is positioned along the measuring line (Z) so that the light conductors receive the passed through scanning light from essentially point-form regions of the object to be measured, and whereby the output of the optical multiplexer is optically connected with a photoelectric converter arrangement (W), preferably by way of a further light conductor.

BRIEF DESCRIPTION OF THE DRAWINGS

The invention will be discussed in more detail in the following by way of the drawings. It shows FIG. 1 a principle schematic illustration of the scanning device in accordance with the invention, FIG. 2 a complete view of a practical exemplary embodiment, FIG. 3 a detailed view of the most essential component of the scanning arrangement according to FIG. 2, FIG. 4 a detailed view of the collector arrangement of the scanning device according to FIG. 2, and FIG. 5 a section through the optical multiplexer of the scanning device.

DETAILED DESCRIPTION OF THE PREFERRED EMBODIMENT

Figure 1:
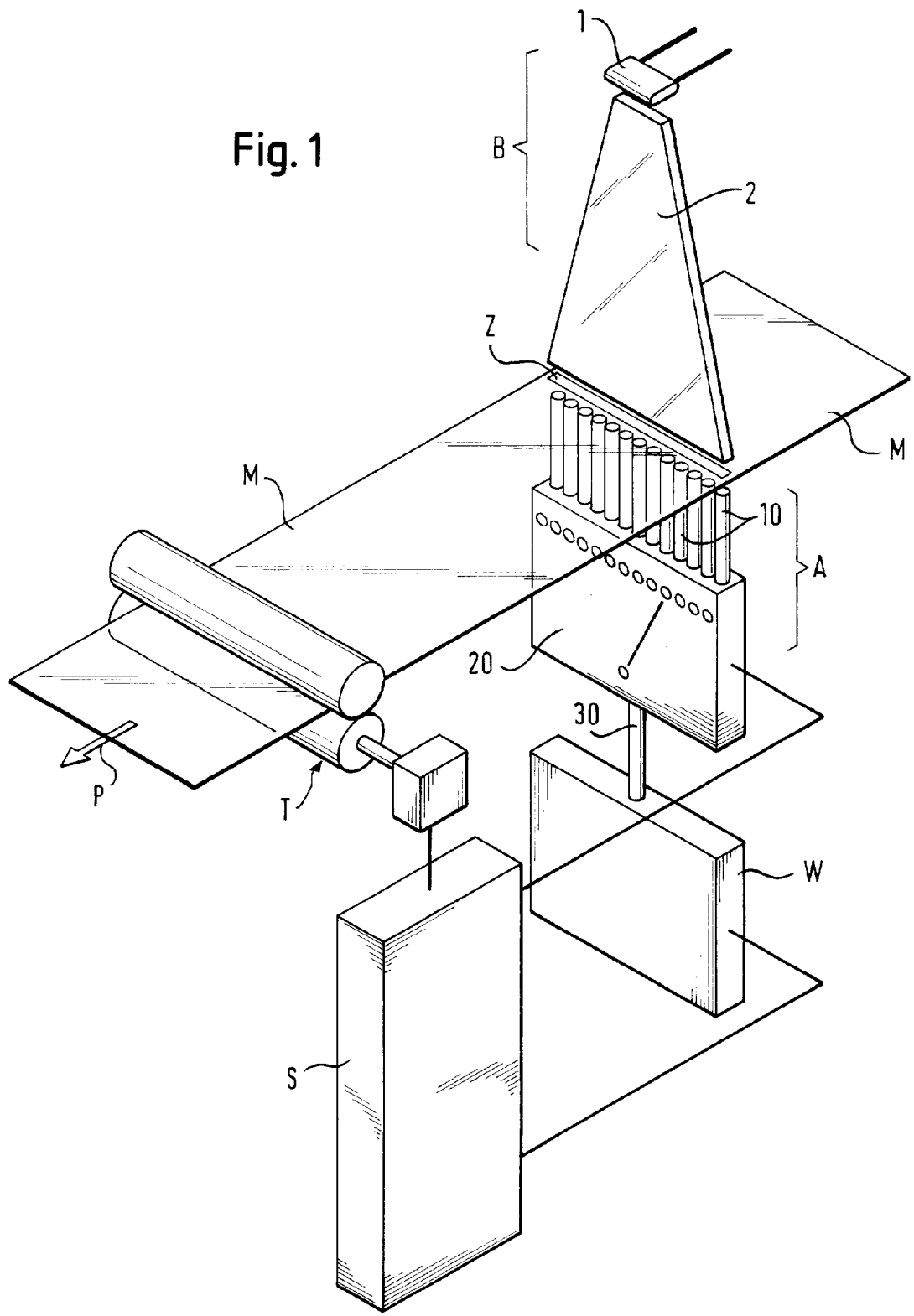

The most important components of the scanning device in accordance with the invention are best apparent from the principle schematic illustration of FIG. 1 Accordingly, the scanning arrangement includes a transport arrangement T indicated by transport rollers for the transparent object M to be scanned, an illuminating arrangement B, a collector arrangement A, a photoelectrical converter arrangement W, and a control arrangement S, which on one, the hand controls the transport arrangement T, the collector arrangement A and the converter arrangement W and, on the other hand, processes the electrical signals produced by the converter arrangement W or treats them prior to further processing.

The transparent object M to be measured is typically a photographic film strip. It is transported by the transport arrangement T in the transport direction indicated by the arrow P. The illuminating arrangement B exposes the object M to scanning light in a small, linear area, which is referred to in the following as measuring line Z, and which essentially extends transverse to the transport direction P. By appropriate advancement of the object M to be measured, the total surface to be scanned of the later is exposed in successive parallel lines.

The scanning light which passes the object to be scanned in the area of one measuring line Z is received by the collector arrangement A and fed to the photoelectric converter arrangement W. The latter converts the collected light into corresponding electrical signals which are fed to the control arrangement S, where they are then available for further processing.

The scanning device in these respects generally corresponds to conventional scanning devices of this type so that the skilled person so far does not need any further explanation.

The essential differences between the scanning device in accordance with the invention and conventional devices of this type consist in the construction of the illuminating arrangement B, the receptor arrangement A and the photoelectric converter arrangement W. These will be further discussed in the following with reference to FIGS. 2 to 5.

The illuminating arrangement B, in general, consists of a light source 1 and a light guide body 2 which is divided into three optically connected sections 2a, 2b and 2c, and has a smaller light entry surface 2d and a larger light exit surface 2e. The light source 1 is typically a halogen lamp. The light guide body 2 is in the shape of a thin, slightly curved, trapezoid plate of rectangular cross section. It is positioned between the light source 1 and the object M to be measured and guides the scanning light from the light source to the object to be measured. The dimensions of the light exit surface 2e correspond essentially with those of the measuring line Z so that the object to be measured is essentially only subjected to scanning light in the area of the measuring line Z.

The section 2a of the light guide body 2 which, in the drawing, is the uppermost section directed towards the light source 1 consists of glass or quarz glass, the remaining sections 2b and 2c consist of an appropriate transparent plastic, for example, plexiglass. An infrared filter 3 is positioned between the first section 2a and the intermediate section 2b of the light guide body 2. If desired, further filters can be provided to influence the spectral characteristics of the scanning light.

When the scanning device in accordance with the invention is used in a photograph copier, the light source 1 can be identical to the copying light source of the copier. It is apparent from FIG. 2 how the scanning light is branched off from the copier light by the light guide body 2 inserted laterally into the concave mirror 4 surrounding the lamp 1 generally present in copier light sources.

The collector arrangement A is positioned on that side of the object M to be measured which is opposite the side of the illuminating arrangement B, in the drawings below the object to be measured. It has the task to pick up the scanning light which has passed through the object M to be measured in the area of the measuring line Z and to transfer it to the converter arrangement W. It is a further task in accordance with the invention to resolve the measuring line into a multiplicity of discreet scanning points, the dimension of which in longitudinal direction of the measuring line, is, for example, about the same as the width of the measuring line. The resolution of the scanning device is thereby the same in both dimensions (transport direction P and longitudinal direction of the measuring line Z). Of course, different resolutions can be selected.

The collector arrangement A consists essentially of a multiplicity of light conductors 10, for example, in the form of individual light conducting fibers, and an optical multiplexer 20. Each light conductor 10 has a light input and a light output E end. The light conductors 10 are positioned in and protected by an essentially finger-shaped holder 15 which extends transverse to the transport direction of the object M to be measured and under the latter. The light conductors are thereby positioned in such a way that their light input ends, which protrude from the holder 15, are positioned in one plane and behind one another in a light conductor line 16 which is located immediately below the measuring line Z of the object M to be measured. Each light conductor 10 thereby receives only shone-through light from one essentially point-form area of the measuring line Z or the object M to be measured, whereby the desired resolution of the measuring line Z into discreet scanning points is achieved. The dimensions of the scanning points result from the cross section of the light input ends of the light conductors 10, the geometrical shape thereof (for example, lenticular and rounded), and the distance of the light input ends from the measuring line Z or the object M to be measured. The number of light conductors 10 is, for example, 28, but can also be larger or smaller depending on the desired resolution.

The holder 15 is combined with the above-mentioned optical multiplexer to a mechanical unit. As best apparent from the cross sectional illustration of FIG. 5, the multiplexer 20 includes a light-proof housing 21 which is mounted onto the holder 15 and has an end wall 22, which is provided with first and second connector openings 23 and 24. The first connector openings 23 form the inputs of the multiplexer 20 and are positioned along a circle, the second connector openings 24 form the output of multiplexer 20 and are located in the center of this circle. The light output ends of the light conductors 10 are fastened in the first connector openings 23, preferably in the same sequence as their light input ends are placed in the light conductor line 16. A further light conductor 30 is fastened in the second connector opening 24 which leads to the photoelectric converter arrangement W and optically connects the latter with the multiplexer 20.

An optical commutator 25 is rotatably mounted in the housing 21 of the multiplexer 20 and is driven by way of a motor 26 positioned within the housing 21. The axis of rotation of the optical commutator 25 extends through the center of the circle along which the first connector openings 23 are positioned and is thereby also coaxial with the second connector opening 24. An optical bridge 27 formed by a light guiding fiber is formed in the commutator 25, the ends of which end axial or on the above-mentioned circle. Rotation of the commutator 25 thereby optically connects the individual light conductors 10 sequentially and cyclically with the further light conductor 30 through the optical bridge 27. The motor 26 is controlled by the control arrangement S and the respective rotational position of the commutator 25 is detected by the control arrangement S by way of a light barrier 28–29, also positioned in the housing 21.

By way of the optical multiplexer 20, the light which has passed through the object M to be measured in the area of the measuring line Z is sequentially guided for each individual scanning point of the measuring line to the photoelectric converter arrangement W. The latter, according to a further aspect of the invention, is constructed as a spectrometer which produces spectral data which represent the portions of the shone-through light detected in a preselected number of spectral ranges. The typical widths of such spectral ranges are 10 to 20 nm. These spectral data are then available for further processing or evaluation through the control arrangement S. Suitable spectrometers are known and need not be discussed any discussed any further. It is only mentioned that such spectrometers are typically provided with a holographic grid applied to a concave mirror as dispersive element as well as a diode field as actual converter element.

Figure 2:
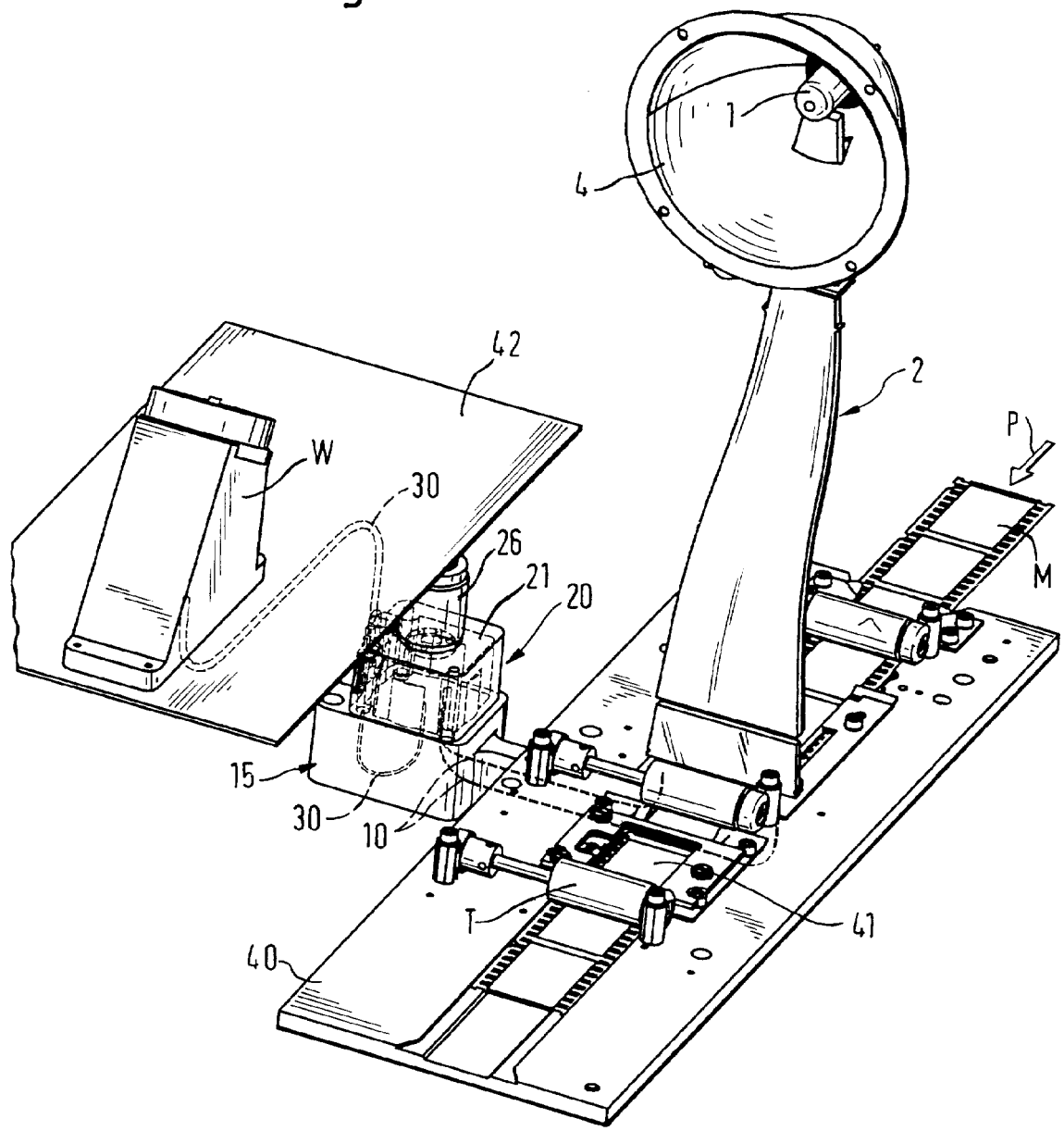
Figure 3:
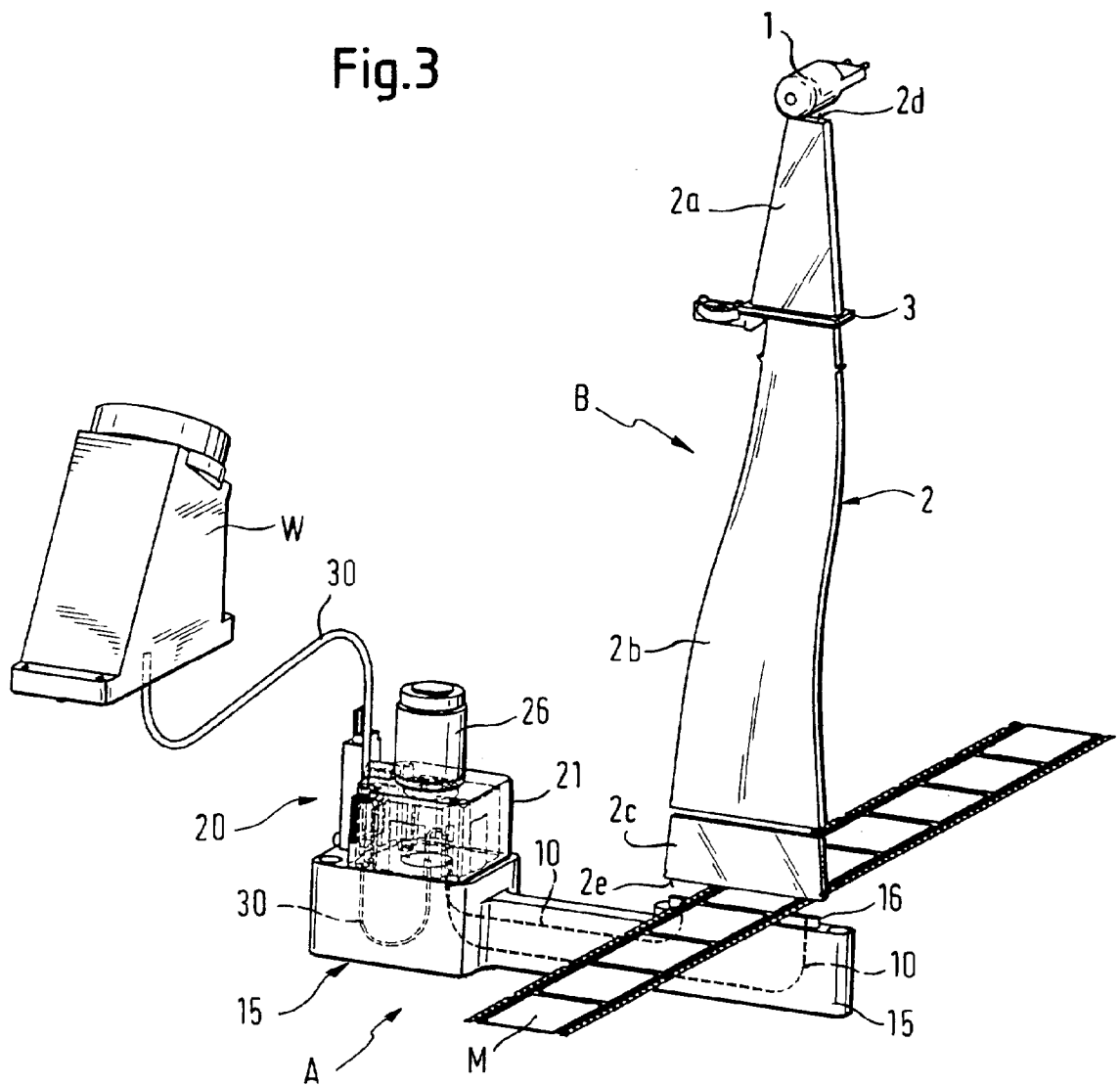
Figure 4:
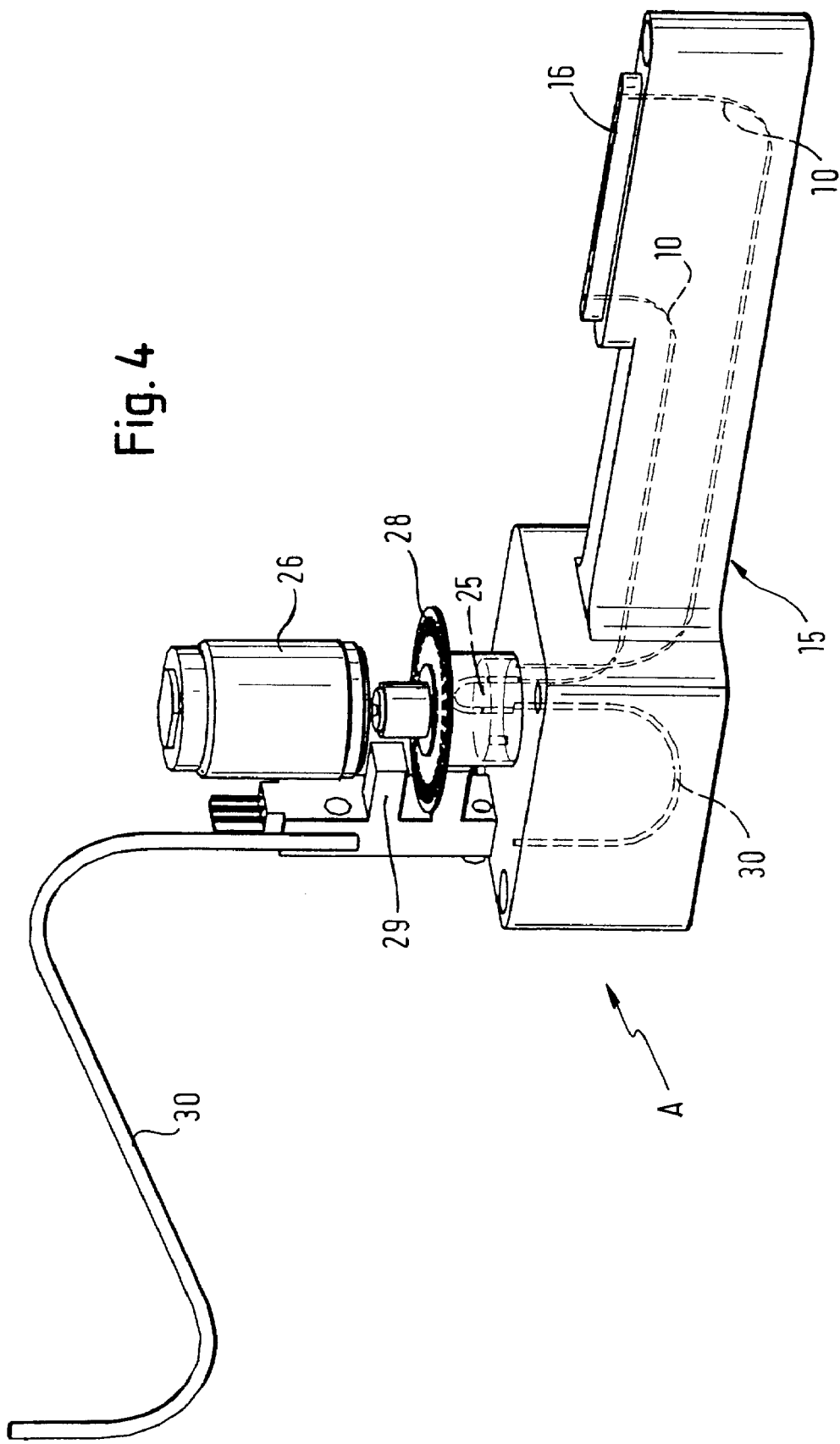
Figure 5:
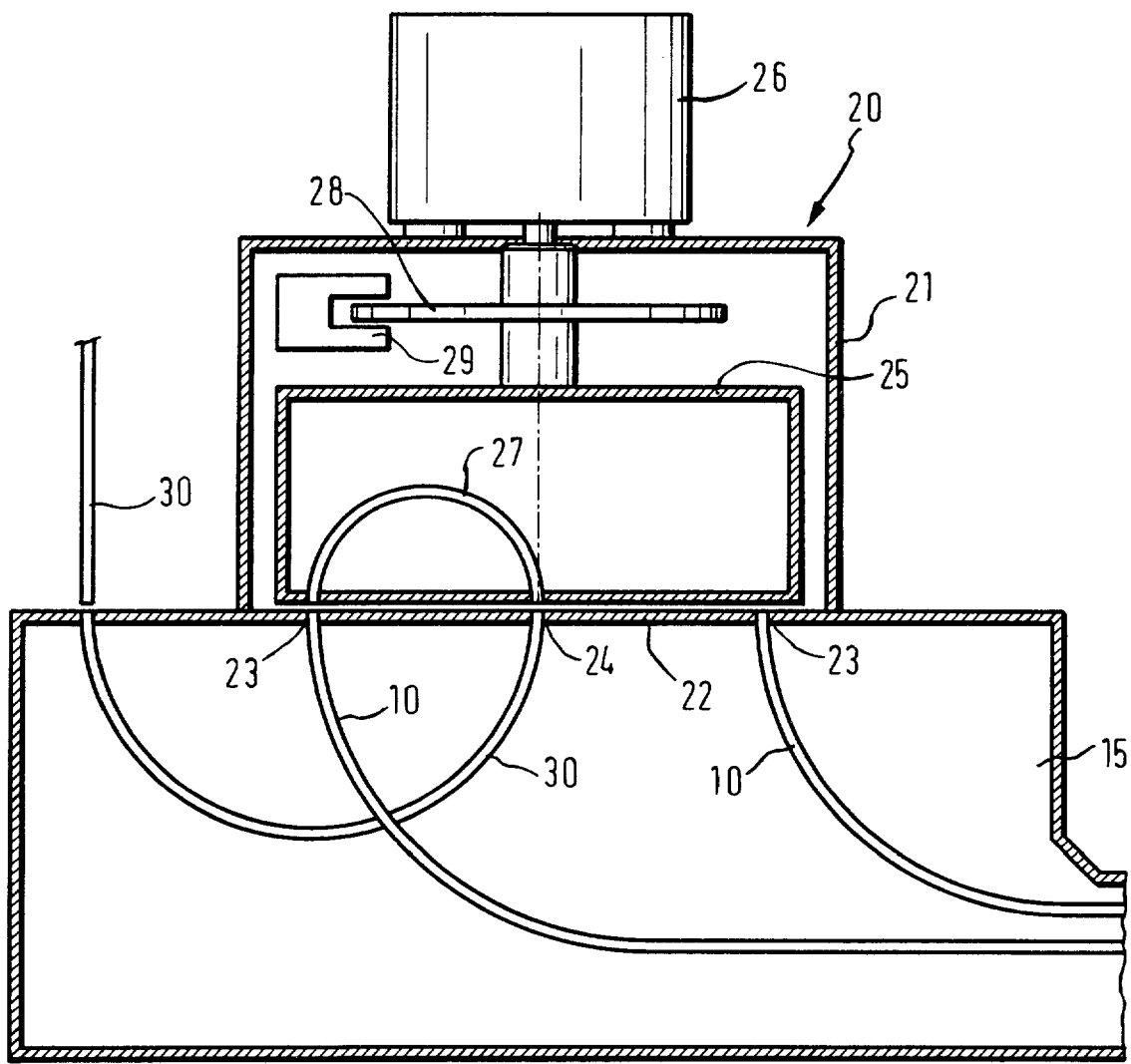

FIG. 2 shows the scanning device in accordance with the invention in the context of a photograph copier. In addition to the above-mentioned parts of the device, a film platform 40 with a copier window 41 is shown. The spectrometer W is positioned on a mount surface 42 of the photograph copier.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

I claim:

1. A scanning device for point-form photoelectric scanning of a transparent object, comprising:
   a transport arrangement for transporting an object to be scanned in a transport direction;
   an illuminating arrangement for exposing the object to measuring light in a linear measuring line extending across the object transverse to the transport direction;
   a collector arrangement for measuring light having passed the object in an area of the measuring line; and
   a photoelectric converter arrangement optically connected with the collector arrangement for converting the measured light which passed through the object into corresponding electrical signals, the collector arrangement comprising:

a multiplicity of fiber-shaped light conductors each having an input end and an output end with the input ends being positioned along the measuring line for receiving the passed through measuring light;

an optical multiplexer having a plurality of inputs corresponding in number to the multiplicity of light conductors and one output, the output end of each light conductor being connected with one of the inputs of the optical multiplexer, and the output of the optical multiplexer being optically connected with the photoelectric converter arrangement wherein the multiplexer includes an optical commutator for optically connecting each of the plurality of inputs sequentially with said one output.

2. Device according to claim 1, wherein the photoelectric converter arrangement is a spectrometer, said spectrometer producing spectral data representing portions of the measured light in a predetermined number of spectral ranges.

3. Device according to claim 1, wherein the optical commutator is rotatable and is driven by a motor, the optical commutator cyclically and sequentially connects the inputs of the multiplexer with the output of the multiplexer.

4. Device according to claim 1, wherein the illuminating arrangement comprises:

a light source and a light guide body guiding light from the light source to the object to be measured and having a light input surface and a light output surface being positioned in an immediate vicinity of the object to be measured, the cross section of which is selected such that the object to be measured is subjected to the measuring light only in a region of the measuring line.

5. Device according to claim 4, wherein the light guide body comprises at least two optically connected sections and a filter positioned therebetween.

6. Device according to claim 5, wherein one of said at least two optically connected sections of the light guide body is adjacent the light source and is made of glass, and the other of said at least two optically connected sections is made of plastic.

7. Device according to claim 1, wherein the light conductors of the collector arrangement are positioned in a finger-shaped holder, said holder being combined with the optical multiplexer to a mechanical unit.

8. Device according to claim 1, wherein said transparent object is picture fields of a photographic film in a photographic copier.

9. Device according to claim 1, wherein said light conductors are fiber-shaped light conductors.

10. Device according to claim 1, wherein said optical multiplexer is optically connected with said photoelectric converter arrangement via an additional light conductor.

11. A device according to claim 1, wherein the commutator connects each of the inputs with said output by an optical bridge formed by a light guiding fiber.

* * * * *